Figure 1:
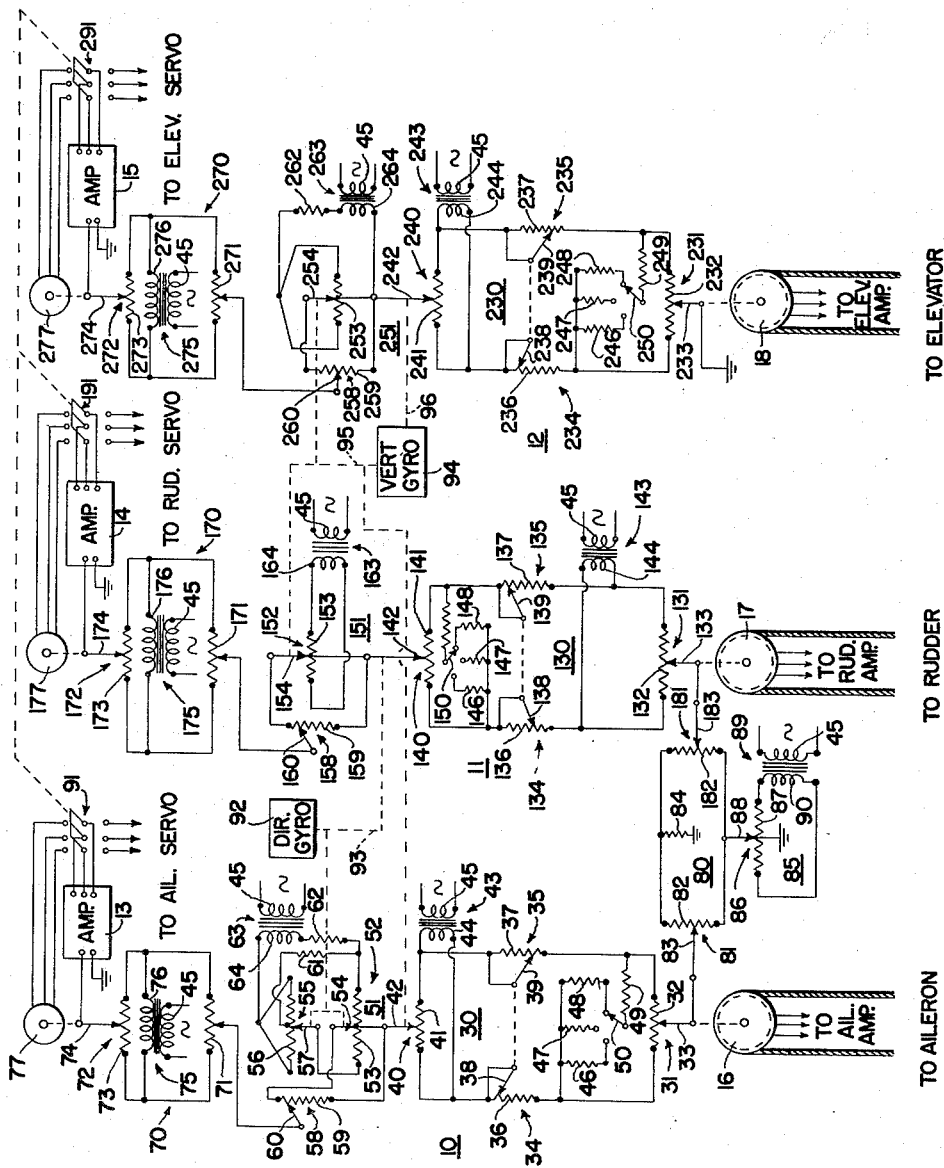

Dec. 3, 1957    J. F. SCHOPPEL    2,814,954
AIRCRAFT STEERING APPARATUS
Original Filed Dec. 8, 1944    3 Sheets-Sheet 1

INVENTOR.
JOHN F. SCHOEPPEL
BY Gordon Reed
ATTORNEY

Dec. 3, 1957   J. F. SCHOPPEL   2,814,954
AIRCRAFT STEERING APPARATUS
Original Filed Dec. 8, 1944   3 Sheets-Sheet 2
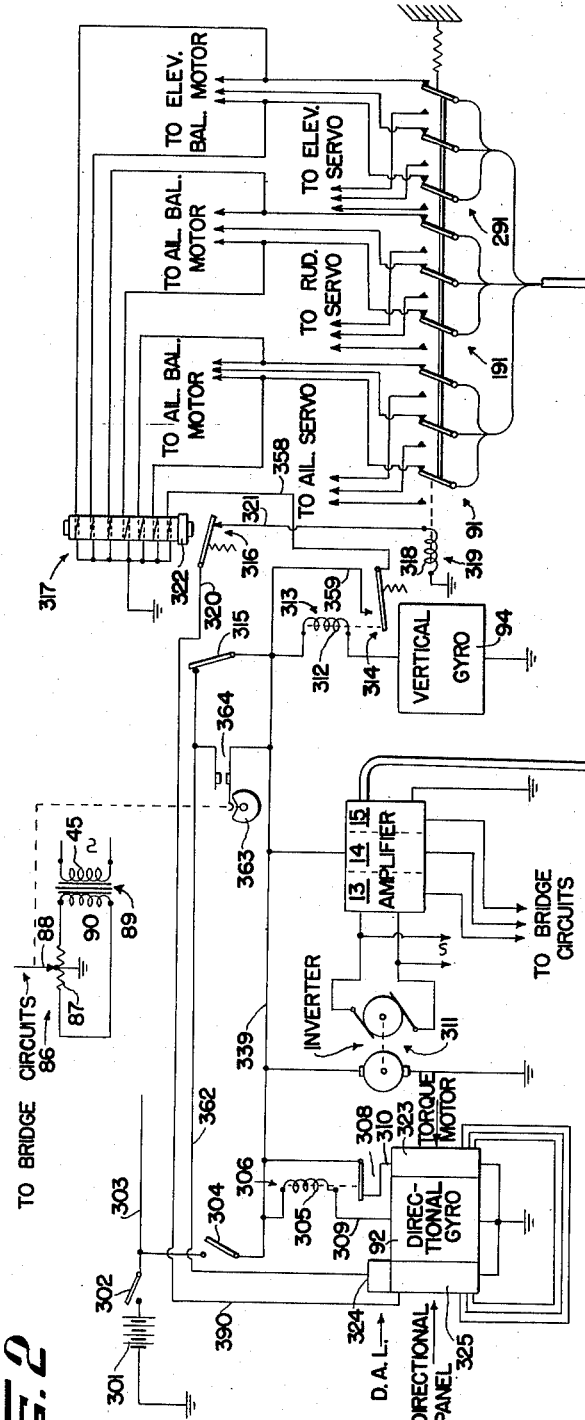
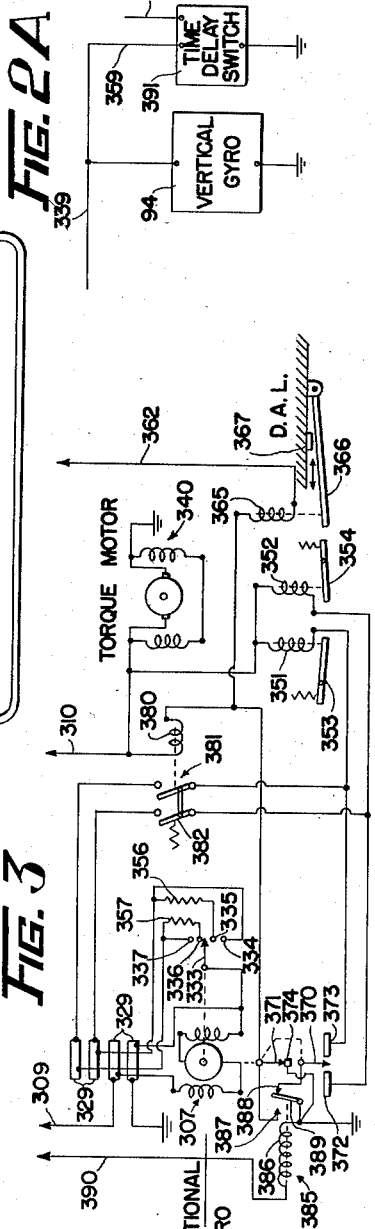
INVENTOR.
JOHN F. SCHOEPPEL
BY *Gordon Reed*
ATTORNEY Dec. 3, 1957    J. F. SCHOPPEL    2,814,954
AIRCRAFT STEERING APPARATUS
Original Filed Dec. 8, 1944    3 Sheets-Sheet 3
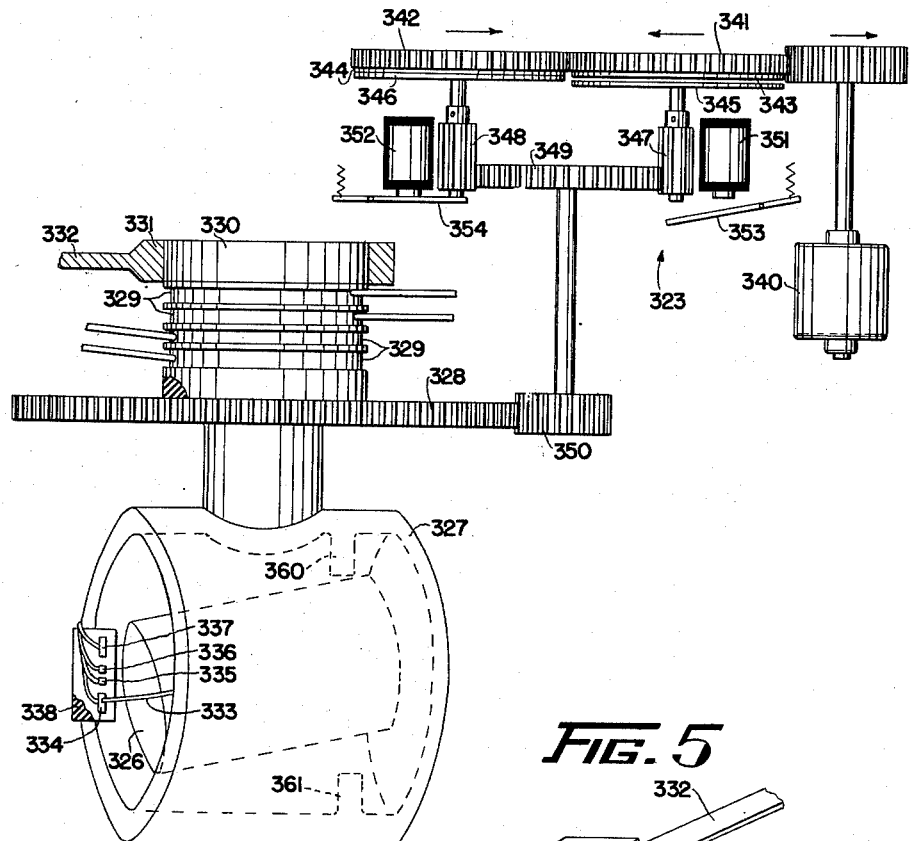
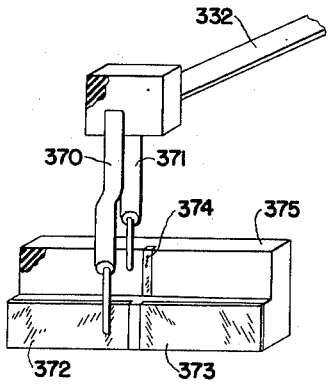
INVENTOR.
JOHN F. SCHOEPPEL
BY
ATTORNEY United States Patent Office 2,814,954
Patented Dec. 3, 1957

2,814,954

AIRCRAFT STEERING APPARATUS

John F. Schoeppel, Minneapolis, Minn., assignor to Minneapolis-Honeywell Regulator Company, Minneapolis, Minn., a corporation of Delaware Original application December 8, 1944, Serial No. 567,254, now Patent No. 2,715,709, dated January 20, 1955. Divided and this application August 23, 1954, Serial No. 453,394

25 Claims. (Cl. 74—5.4)

My invention relates generally to control systems and more particularly to systems having a condition responsive element and a rebalancing element connected together so that an unbalance between the two will cause the operation of a condition controlling means and simultaneously operate the rebalancing element to place the system in a new condition of balance.

This application is a division of co-pending application Serial No. 567,254, filed December 8, 1944, Patent 2,715,709, dated January 20, 1955.

In operation of airplanes, because of the loading or other unbalance, it is often necessary to make greater use of a control surface, such as the elevator, to maintain the plane in a level attitude and on the same heading. When there is such an unbalance, if the control surfaces were in streamlined position, the plane would deviate from the desired condition; hence the control surfaces must be maintained in a different position, and any deviation of the surface from that position causes the usual reaction of the plane. This new or balanced position must be maintained all the time that the plane is in the proper attitude and on the proper heading, changes being made only when there is a deviation from these conditions; and this is true whether the plane is being flown by a human or an automatic pilot. Since the unbalance may vary in direction and magnitude, though generally remaining substantially constant for a given flight, a properly designed autopilot will have provision for aligning the balanced position of the control surfaces with the zero point, or position of no control signal, of the controlling device. The majority of autopilots use a gyroscope as the controlling device to sense any deviation of the plane from its desired attitude or heading, and to originate the proper signal to operate the control surfaces so as to return the plane to its proper attitude. Means must therefore be provided for aligning the balanced position of the control surfaces with the zero point of the gyroscope, as previously mentioned; and, depending upon whether the operating means is electrical, mechanical, or fluid, this aligning means may take the form of resistors, linkages, or valves.

Because of the versatility and precision available with electrical circuits, their use as a control means has found increasing favor among pilots. In the hands of an experienced pilot, the electrically operated automatic pilot produced results superior to those of any differently operated means; and an example of such an automatic pilot is shown in the application of Willis H. Gille, Serial No. 447,989, filed June 22, 1942. However, one of the disadvantages of an electrically operated system has been the somewhat involved procedure necessary for a proper adjustment of the automatic pilot. Because of the sensitivity and fast response of the electrical system it is necessary that the aligning, or centering, be accomplished accurately; and it has been found that many pilots, through inexperience or inattention, fail to align the electrical system with the physical trim of the airplane, and hence when the autopilot is engaged there is a pronounced lurch as the ship assumes a new position.

It is therefore a major object of my invention to provide a control system which requires less attention and ability on the part of the operator than systems previously used, but one which nevertheless will provide a degree and quality of control previously attainable only by skilled operators.

It is another object of my invention to provide a control system wherein operations which previously had to be performed sequentially and after proper time delay, are performed automatically without further attention from the operator.

It is also an object of my invention to provide a control system having automatic centering or balancing means adapted to balance the system when the apparatus controlled by it is not connected thereto.

It is an object of my invention to provide a control system which may not be operated if a malfunction exists or if certain required conditions have not been met.

It is a further object of my invention to provide a gyroscope having control elements connected thereto and means associated therewith to center these elements automatically when the gyroscope reaches a predetermined speed.

It is an object of my invention to provide a gyroscope having motor means to maintain the rotor of the gyroscope normally in a horizontal position, and having means preventing operation of the motor until the gyroscope rotor has reached a predetermined speed.

It is another object of my invention to provide a gyroscope which may not be connected into a control system if its rotor has not reached a predetermined speed.

Still another object of my invention is to provide a balancing means which may be connected so as to furnish a signal opposing the signal from a control system, thereby providing a resulting signal which is zero or which differs from zero by a predetermined amount.

These and other objects of my invention will become apparent from the following description of a preferred form thereof and the drawings illustrating that form, in which:

Figure 1 is a schematic diagram of the alternating current networks used in my system, Figure 2 is a schematic diagram of the power and interlock circuit used in my system, Figure 2a is a schematic diagram of a portion of the power diagram shown in Figure 2, and showing a modified embodiment of my invention, Figure 3 is a detailed schematic diagram of the directional stabilizer and parts associated therewith, Figure 4 is a view of the gyroscope of the directional stabilizer showing the action of the torque motor and Figure 5 is a detailed view of the centering contacts used in conjunction with the directional stabilizer.

Referring now to the drawings and particularly to Figure 1 thereof, the numeral 10 indicates a network of several bridges containing condition responsive devices so arranged that a change in condition, sensed by them, will be sent as a signal to an amplifier 13 where the signal will be amplified and used to operate a servo motor 16 connected by cables to the ailerons, not shown, of the airplane. A similar network 11 connected to amplifier 14 operates servo motor 17 to control the rudder, not shown, while an elevator network 12 sends a signal to an amplifier 15 which controls a servo motor 18 driving the elevator, not shown.

In the aileron network 10 a bridge 30 has a rebalancing potentiometer 31 consisting of a resistor 32 and a wiper 33, a pair of centering potentiometers 34 and 35 consisting of resistors 36 and 37 with wipers 38 and 39, respectively, a gyroscopically controlled potentiometer 40 consisting of a resistor 41 and a wiper 42, a source of power such as a transformer 43 having a secondary winding 44 and a primary winding 45 and a series of fixed resistors 46, 47, 48 and 49. The gyroscope resistor 41 is connected across the secondary 44; and the rebalancing resistor 32 in series with resistors 36 and 37 of centering potentiometers 34 and 35 is connected in parallel with the gyroscope resistor 41. The upper end of centering resistor 36 is connected to its wiper 38 so that as the latter is moved back and forth more or less of the resistor 36 is shorted. A similar connection is made between centering resistor 37 and its wiper 39 and the two wipers are mechanically connected together and provided with manually controllable means so that as one of the two resistors has progressively more of its resistance shorted, the other resistor has progressively less of its resistance shorted. In this way the total resistance through potentiometers 31, 34, and 35 remains a constant as the centering potentiometer wipers 38 and 39 are moved from one extreme position to the other. A shunt connection across rebalancing potentiometer 31 is provided by resistance 49 which is selectively connected in series with one of three fixed resistors 46, 47, or 48 by switch 50. The resistors 46, 47 and 48 have different values and are arranged so that a high, medium, or low resistance shunt across balancing potentiometer 31 may be provided.

Above bridge 30 in network 10, as shown in Figure 1, is a second bridge 51 consisting of a banking potentiometer 52 having a center tapped resistor 53 and a wiper 54, an accelerating potentiometer 55 having a center tapped resistor 56 and a wiper 57, a compensating potentiometer 58 having a resistor 59 and a wiper 60, a pair of resistors 61 and 62, and a source of power, shown as a transformer 63 having a secondary winding 64 and primary winding 45. The ends of the accelerating resistor 56 are connected together and to one terminal of the secondary 64 of the transformer 63 and the center tap is connected through resistor 61 and resistor 62 to the other terminal of the secondary 64. The wiper 57 of the accelerating potentiometer 55 is connected to one end of the resistor 53 of the banking potentiometer 52 and the other end of the resistor 53 is connected through resistor 62 to its terminal of the secondary 64 of the transformer 63. The center tap of resistor 53 is connected to the wiper 42 of gyroscope potentiometer 40 and is also connected to one end of resistor 59 of compensating potentiometer 58 while the wiper 54 of banking potentiometer 52 is connected to the opposite end of the resistor 59. It will thus be seen that the voltage impressed across the resistor 53 of the banking potentiometer 52 will be dependent upon the position of the wiper 57 of the accelerating potentiometer 55, this voltage being a minimum when the wiper is aligned with the center tap of the potentiometer 55 and a maximum when it is at either extreme position to one side. Since the ends of the resistor 56 of the accelerating potentiometer 55 are connected together there will be no inversion or shifting of phase as the wiper 57 passes from one side of the center tap to the other; whereas in potentiometer 52, as wiper 54 moves from one end of resistance 53 to the other, the voltage measured between the center tap and the wiper 54 will decrease until a zero value is reached when the wiper is in line with the center tap and then gradually increase, but with a phase shift of 180 degrees, reaching a maximum when the wiper 54 is at the other extreme end of resistor 53. Wiper 57 of accelerating potentiometer 55 and wiper 54 of banking potentiometer 52 are mechanically connected together so that both move simultaneously in the same direction as they leave their center positions so that a higher voltage is impressed across resistor 53 and a greater percentage of this total voltage across this resistor appears between the center tap and wiper 54. This voltage will thus vary as something more than a linear function of the displacement and, because of resistances 61 and 62, will be somewhat less than a squared or second order function, but will nevertheless be an exponential function lying somewhere in between these two limits.

From wiper 60 connection is made to a bridge 70 which includes a center tapped resistor 71, a balancing potentiometer 72 consisting of a resistor 73 with a wiper 74, a source of power such as a transformer 75 having a secondary winding 76 and a primary winding 45. The center tapped resistance 71 is connected across the secondary windings 76 of the transformer 75 while the center tap of the resistor is connected to the wiper 60 of the compensating potentiometer 58; the potentiometer 72 is likewise connected across the secondary winding 76 so that the resistors 71 and 73 are in parallel and the voltage signals developed by the bridge 70 will appear across the center tap of the resistor 71 and the wiper 74 of the potentiometer 72. From wiper 74 connection is made to the amplifier 13, which, under certain conditions, drives a balancing motor 77 to which the wiper 74 is mechanically connected.

The rudder network 11 is similar in many respects to the aileron network 10 and consists of three bridges 130, 151, and 170 connected together similarly to bridges 30, 51 and 70. Bridge 130 includes a rebalancing potentiometer 131 having a resistor 132 and a wiper 133, a pair of centering potentiometers 134 and 135 consisting of resistors 136 and 137 with wipers 138 and 139, respectively, a gyroscopically operated potentiometer 140 consisting of resistor 141 and wiper 142, a three-position switch 150, and fixed resistors 146, 147, 148 and 149.

The rebalancing potentiometer 131 is connected across the output terminals of the secondary 144 of a transformer 143, and a series circuit, consisting of the centering potentiometer 134, the gyroscopically operated potentiometer 140 and the centering potentiometer 135, is connected in parallel with the balancing potentiometer 132. The wiper 138 is electrically connected to one end of the centering potentiometer 134 and the wiper 139 is similarly connected to one end of the potentiometer 135 so that movement of the wiper shorts a greater or less amount of its associated resistance. The two wipers are mechanically connected together and provided with manual operating means so that as the wipers are moved, the total resistance in the series circuit consisting of the centering potentiometer 134, the gyroscopically operated potentiometer 140, and the centering potentiometer 135, remains a constant. Connected in parallel with the gyroscopically operated potentiometer 140 is a resistance circuit consisting of fixed resistor 149 connected through switch 150 to one of the three fixed resistors 146, 147, or 148, these last three resistors having different values so that depending upon the position of switch 150, a low, medium, or high resistance circuit is shunted across the potentiometer 140.

From wiper 142 of the gyroscopically operated potentiometer 140 connection is made to a bridge 151 which includes a gyroscopically operated "skid" potentiometer 152 having a center tapped resistor 153 and a wiper 154, a compensating potentiometer 158 which has a resistor 159 and a wiper 160, and a source of power such as a transformer 163 having a secondary winding 164 and a primary winding 45. The ends of the resistor 153 are connected to the leads from the secondary 164 of the transformer 163, and the center tap of the resistance is connected to the wiper 142 of the gyroscopically operated potentiometer 140. Wiper 154 of the "skid" potentiometer 152 is connected to one end of the resistor 159 of the compensating potentiometer 158, while the other end of the resistor is connected to the center tap of the resistor 153 so that wiper 160 of the compensating potentiometer 158 may be set to receive any desired percentage of the voltage developed between the center tap and the wiper 154 of the potentiometer 152.

Bridge 170 is similar in all respects to bridge 70 shown in the aileron network and has a center tapped resistor 171, a balancing potentiometer 172 consisting of a resistor 173 and a wiper 174, and a transformer 175 having a secondary 176 and a primary 45. Center tapped resistor 171 is connected across the output terminals of the secondary 176 of the transformer 175 and the resistor 173 of the centering potentiometer 172 is likewise connected across the output terminals of the secondary 176 placing it in parallel with center tapped resistance 171. The center tap of resistor 171 is connected to wiper 160 of the compensating potentiometer 158, and wiper 174 of balancing potentiometer 172 is connected to the input of an amplifier 14 which, under certain conditions, will drive a balancing motor 177 which positions the wiper 174.

The aileron and rudder networks are connected together through a bridge 80 consisting of an aileron trimming potentiometer 81 having a resistor 82 and a wiper 83, a rudder trimming potentiometer 181 having a resistor 182 and a wiper 183, and a fixed resistor 84. Wiper 83 of aileron trimming potentiometer 81 is connected to wiper 33 of the rebalancing potentiometer 31; wiper 183 of the rudder trimming potentiometer 181 is connected to the wiper 133 of the balancing potentiometer 131; and the resistors 82 and 182 of potentiometers 81 and 181 are connected together so that they are in parallel. The parallel circuit thus formed is grounded through fixed resistor 84, while the other side of the parallel circuit is connected to a bridge 85 consisting of a potentiometer 86 having a center tapped resistor 87 with wiper 88, and a souce of power such as a transformer 89 having a secondary winding 90 and a primary winding 45. The resistor 87 is connected across the terminals of the secondary 90 of transformer 89, the center tap of the resistor is grounded, and the wiper 88 is connected to the bridge circuit 80 as previously mentioned. Since one of the input terminals of each of the amplifiers 13 and 14 is grounded, a completed circuit may readily be traced from the grounded center tap of potentiometer 86 through bridge 80 to wiper 33 of rebalancing potentiometer 31, through the centering potentiometers 34 and 35, and through gyroscpically operated potentiometer 40 to bridge 51, where it goes through the compensating potentiometer 58, picking up any signal from banking potentiometer 52, and then to bridge 70, going through center tapped resistance 71 and potentiometer 72 and the wiper 74 thereof to one terminal of the amplifier 13 and thence to ground. Similarly, a circuit may be traced through the rudder network 11 and amplifier 14.

The elevator network 12 is generally similar to the aileron network 10 and rudder network 11 and consists of three bridges 230, 251 and 270 connected in series and to the elevator amplifier 15.

Bridge 230 includes a rebalancing potentiometer 231 having a resistor 232 and a wiper 233, a pair of centering potentiometers 234 and 235 having resistors 236 and 237 with wipers 238 and 239 respectively, a gyroscopically operated potentiometer 240 having a resistor 241 and a wiper 242, a source of power such as a transformer 243 having a secondary winding 244 and a primary winding 45, fixed resistors 246, 247, 248, 249, and a three position switch 250. The gyroscopically operated potentiometer 240 is connected across the terminals of a secondary 244 of the transformer 243, and a series circuit consisting of the centering potentiometer 234, the rebalancing potentiometer 231 and the centering potentiometer 235 is likewise connected across the terminals so that this series circuit is in parallel with the potentiometer 240. One end of the resistor 236 of the centering potentiometer 234 is connected to its associated wiper so that movement of the wiper will shunt a greater or lesser portion of the resistor 236. One end of resistor 237 of potentiometer 235 is likewise electrically connected to its wiper 239 and wipers 238 and 239 are mechanically connected together so that as a greater portion of one resistor is shunted, a lesser portion of the other one is shunted and the total resistance through the circuit consisting of potentiometer 234, rebalancing potentiometer 231 and centering potentiometer 235 remains a constant as these wipers are moved. A resistance branch consisting of the fixed resistor 249 and fixed resistors 246, 247 or 248 is connected in parallel with rebalancing potentiometer 231 and the resistance values of these fixed resistors is so chosen that they will form low, medium and high resistance paths in parallel with the rebalancing potentiometer 231. The resistance value desired may be selected by the three position switch 250, and I prefer to connect the three-position switches in each of the three axes so that switches 50, 150 and 250 may be simultaneously operated from a single lever.

Wiper 233 of rebalancing potentiometer 231 is grounded, and wiper 242 of the gyroscopically operated potentiometer 240 is connected to bridge 251 which includes an "up-elevator" potentiometer 252 having a center tapped resistor 253 and a wiper 254, a compensating potentiometer 258 having a resistor 259 and a wiper 260, a fixed resistor 262 and a source of power such as a transformer 263 having a secondary winding 264 and a primary winding 45. The "up-elevator" potentiometer 252 has the ends of its resistor 253 connected together and through resistor 262 to one terminal of the secondary 264 of the transformer 263. The center tap of the potentiometer 252 is connected to the other terminal of the secondary 264 and also to one end of the resistor 259 of the compensating potentiometer 258. Wiper 254 of the "up-elevator" potentiometer 252 is connected to the other end of resistor 259 of the compensating potentiometer 258, and since the ends of resistor 253 of the "up-elevator" potentiometer 252 are connected together, it will be seen that there will be no phase shift in the voltage appearing across the compensating potentiometer 258 as wiper 254 is moved from one side of the center tap to the other. Wiper 242 of the gyroscopically operated potentiometer 240 is also connected to the center tap of potentiometer 252, and by varying the position of wiper 260 of the compensating potentiometer 258 any desired percentage of the voltage appearing across the ends of the latter potentiometer may be selected and carried on to the centering bridge 270.

Centering bridge 270 is similar to the centering bridges 70 and 170 of the aileron and rudder networks and includes a center tapped resistor 271, a centering potentiometer 272 having a resistor 273 and a wiper 274, and a source of power such as a transformer 275 having a secondary 276 and a primary winding 45. The center tapped resistor 271 is connected across the output terminals of the secondary 276 of the transformer 275 and the resistor 273 of the centering potentiometer 272 is likewise connected across these terminals so that resistor 273 and resistor 271 are connected in parallel. Wiper 260 of the compensating potentiometer 258 is connected to the center tap of resistor 271 and the wiper 274 of the centering potentiometer 272 is connected to one of the input terminals of the amplifier 15, which under certain conditions, is used to drive balancing motor 277 which mechanically moves wiper 274 of the balancing potentiometer 272.

One of the input terminals of amplifier 15 is grounded and it is thus possible to trace a circuit from the grounded wiper 233 of rebalancing potentiometer 231 through centering potentiometers 234 and 235, through the gyroscopically operated potentiometer 240 and the wiper 242 thereof to the bridge 251, where it continues through potentiometer 252 and its wiper 254 and compensating potentiometer 258, going from wiper 260 thereof to center tapped resistance 271 and centering resistance 272, from which it travels through wiper 274 to the amplifier 15 and then to ground.

To transfer control of the amplifiers 13, 14, and 15 from the balancing motors 77, 177, and 277 which position centering potentiometer wipers 74, 174 and 274 respectively, to the servomotors 16, 17 and 18 operating the aileron, rudder, and elevator surfaces respectively, switching means 91, 191 and 291 are provided in the output circuits of amplifiers 13, 14 and 15.

It will be noted that I have shown all transformers connected to the networks 10, 11, and 12 as having a common primary 45. It will be readily apparent that a single transformer having a plurality of secondary windings, or a number of individual transformers, or any combination of the two may be used.

The details of the amplifiers 13, 14 and 15 and servomotors 16, 17 and 18 form no part of my invention, since such amplifiers and servomotors are well known in the art and may be any of a suitable type, such as that shown in the patent to Anschütz-Kaempfe No. 1,586,233 or Whitman No. 1,942,587. Likewise, I do not claim that part of networks 10, 11, and 12 consisting of bridges 30, 51, 130, 151, 230, and 251 in and of themselves, since such networks are known and have not been developed by me.

In the system shown herein, the wipers 33, 133 and 233 of the balancing potentiometers 31, 131 and 231 are operated by the servomotors 16, 17 and 18 respectively. The wipers 38, and 39; 138 and 139; and 238 and 239 of the centering potentiometers 34 and 35; 134 and 135; 234 and 235 respectively are manually operable; wipers 60, 160 and 260 of compensating potentiometers 58, 158 and 258 are likewise manually operable, wipers 74, 174 and 274 of balancing potentiometers 72, 172 and 272 are operated by balancing motors 77, 177 and 277; wiper 88 of potentiometer 86 is manually controlled and wipers 83, and 183 of trimming potentiometers 81, and 181 may likewise be adjusted by hand.

A directional gyroscope 92, more fully described hereinafter, provides a reference for any deviation of the plane in azimuth, and a mechanical linkage 93 operates the wiper 54 of the banking potentiometer 52 and simultaneously operates the wiper 57 of the banking acceleration potentiometer 55 whenever there is a deviation from a predetermined heading. The linkage 93 also operates the wiper 142 of the rudder gyroscopically operated potentiometer 140 so that a total of three wipers 54, 57, and 142 are simultaneously operated by the directional gyroscope. A vertical gyroscope 94 is provided with mechanical means 95 which measures any deviation of the plane about a roll axis, i. e., about an axis extending lengthwise of the plane, and this mechanical means 95 simultaneously operates the wiper 42 of the aileron gyroscopically operated potentiometer 40, the wiper 154 of the "skid" potentiometer 152, and wiper 254 of the "up-elevator" potentiometer 252. Another mechanical means 96 is operated by the vertical gyroscope 94 to indicate any deviation of the plane in pitch axis, i. e., about an axis extending crosswise of a ship, and the means 96 operates the wiper 242 of the gyroscopically operated potentiometer 240 in the elevator circuit.

Operation of bridge circuits

Neglecting for the present the method of engaging the control system, if it is assumed that the airplane is now under the control of the system shown herein with the switching means 91, 191 and 291 connected so that the amplifier controls the operation of the servo motors 16, 17 and 18, it will be seen that if there are no disturbing influences and the plane is to remain in the same attitude and on a predetermined heading, there must be no movement of the control surfaces operated by the servo motors 16, 17 and 18; and the construction of the servo motors and the amplifiers 13, 14 and 15 which are used in such that under these conditions there must be no signals from the aileron, rudder and elevator networks 10, 11 and 12, respectively, to their respective amplifiers. If, through some external cause, the plane now deviates in azimuth, this change in heading will be sensed immediately by the directional gyroscope 92 which will cause the linkage 93 to operate the wipers 54 and 57 of the potentiometers 52 and 55 in the aileron network and also wiper 142 of the gyroscopically operated potentiometer 140 in the rudder network. This will cause a voltage signal to be developed across the ends of the compensating potentiometer 58, and the wiper 60 thereof will send a portion of this signal to the bridge 70 and thence to the amplifier 13 which in turn operates the aileron servo motor 16 so as to bank the plane toward its original course, as will be described in more detail later. Simultaneously, the wiper 142 of the gyroscopically operated potentiometer 140 in the rudder network is moved from its original position, and by the principle of the well known Wheatstone bridge, this will cause a voltage signal to be developed between the wiper 133 of the rebalancing potentiometer 131 and the wiper 142, which will be transmitted through bridges 151 and 170 to the amplifier 14 which drives the servo motor 17 in a direction to cause the rudder to turn the ship toward its original heading.

Following now the various steps which occur as the servo motor 17 drives the rudder to a position to return the ship to its original heading, the servo motor also operates the wiper 133 of the rebalancing potentiometer 131 so that as the wiper is moved, the signal developed across bridge 130 decreases as the rudder reaches its extreme position. However, the movement of the rudder has started the turning of the ship toward its original heading, and this correction has been sensed by the directional gyroscope 92 which thereupon starts to return the wiper 142 of the gyroscopically operated potentiometer 140 to its original position. This will eventually cause the signal across the bridge 130 to decrease to zero value and then increase, but with a 180 degrees phase shift from the original signal. This phase shift is detected by the amplifier 14 and the latter thereupon reverses the direction of rotation of the servo motor 17 so that the rudder is gradually returned toward its neutral position.

A similar action has been taking place in the aileron network 10 save that in that network the signal has been developed by the bridge 51, and transmitted to the amplifier 13 which drives the servo motor 16, and the latter operates the wiper 33 of the rebalancing potentiometer 31 so that a signal appears across the bridge 30 which tends to oppose that appearing across the bridge 51. It will be remembered that the potentiometers 52 and 55 in the bridge 51 cooperate to provide an exponential signal, i. e., a signal whose voltage varies exponentially as a function of the displacement of the wipers from center and hence it will be seen that for small deviations in azimuth only a small amount of aileron correction is applied whereas for large deviations in azimuth a disproportionately greater amount of aileron control is provided. It has been found that a system which provides this exponential feature produces the most accurate flying, since with small deviations, the plane is "skidded" into proper position, while with larger deviations, coordinated recoveries are made.

The vertical gyroscope 94 may be of any suitable type of which there are several known in the art, and its action, as previously described, is to sense any change in the attitude of the ship about its roll or pitch axes. As the plane tilts or banks about its roll axis, the vertical gyroscope 94 remains in its vertical position while the plane moves about it, and wiper 42 of the gyroscopically operated potentiometer 40, wiper 154 of the "skid" potentiometer 152, and wiper 254 of the "up-elevator" potentiometer 252 will thus be moved across their respective potentiometers which are rigidly mounted with respect to the frame of the airplane. The movement of wiper 42 with respect to resistor 41 of the aileron gyroscopically operated potentiometer 40 will unbalance the bridge 30 and cause a signal to be sent to the amplifier 13 which will in turn operate the servo motor 16 to return the ship to its original position in much the same manner as has been previously discussed except that no exponential signal is introduced in the aileron network 10. At the same time wiper 154 is moved with respect to resistance 153 of the "skid" potentiometer 152 to cause the signal to be sent to the amplifier 14 to operate servo motor 17 and provide rudder action to assist in returning the ship to its previous position. The need for both aileron and rudder action to restore the plane to its original position will be apparent when it is remembered that when one wing of the plane is lower than the other, the plane tends to turn toward the lower wing; and to overcome this tendency, rudder control is needed to maintain the craft on its same heading while at the same time aileron control is applied to bring the wings back to their level position. Similarly, aileron control is applied when the ship is making a turn as controlled from the directional gyroscope since the ailerons aid considerably in turning a plane; in fact, in some of the larger planes the ship may be turned by using only the aileron and disregarding the rudder control.

To provide means for adjusting the rate of return from a given angular deviation of the heading of the plane, the compensating potentiometer 58 may be adjusted to select the desired amount of bank, upon which the rate of return will depend. For the most efficient flying and for the greatest comfort of the passengers, all turns and banks should be coordinated. That is, the resultant of the centrifugal force in the turn and the acceleration due to gravity should be parallel to the normal vertical axis of the plane, and there will thus be no sensation of skidding (which occurs when the plane is insufficiently banked and objects are urged outwardly from the center of the turn) nor any sensation of slipping (when the plane is too steeply banked and objects are urged toward the center of the turn). Since the banking potentiometer 152 is operated by the vertical gyroscope 94 whenever the plane is banked, the wiper 160 of the compensating potentiometer 158 may be adjusted to give the needed amount of rudder action so that the operation of the plane will be coordinated and there will be no skidding or slipping when the plane is in a bank.

As is well known to those who have piloted an airplane, whenever the plane is banked, a certain amount of lift is lost and the plane thus tends to settle or lose altitude even though it may retain the same attitude as measured about its pitch axis. When a plane is operated manually, the pilot applies up-elevator whenever he is in a bank either to the right or left to overcome this tendency; and the same effect is obtained in this control system by the mechanical means 95 moving the wiper 254 of the "up-elevator" potentiometer 252 away from its center position whenever the plane is banked to either side.

As has been previously mentioned, the movement of the wiper 254 toward either side of the potentiometer 252 introduces a signal into the network 12 which varies as the distance of the wiper from center, but which has the same phasing on either side of the center tap of the potentiometer. The signal resulting from this movement of the wiper 254 of the up-elevator potentiometer 252 is phased so as to cause the amplifier 15 to operate the servo motor to drive the elevator in an upward direction, and by adjusting the wiper 260 of the compensating potentiometer 258 a sufficient amount of the up-elevator may be obtained to maintain the craft at the same altitude while it remains in the bank.

The vertical gyroscope 94 also operates to maintain the craft in its same attitude about its pitch axis so that it does not nose up or down and thus climb or dive. This is done by the mechanical means 96 which detects any variation about the pitch axis of the plane and moves the wiper 242 of the gyroscopically operated potentiometer 240 so that the bridge 230 then develops a signal which is transmitted to the amplifier 15 to control the elevator servo motor 18 and apply the necessary corrective movement to the elevator itself. The operation of the servo motor 18 drives the wiper 233 of the rebalancing potentiometer 231 and the sequence of operation is then similar to that described in the operation of the rudder network previously covered. It should be noted that the up-elevator potentiometer 252 is connected so that any movement of its wiper 254 from its center position will cause the servo motor 18 to drive the elevator upwardly whereas movement of the wiper 242 of the gyroscopically operated potentiometer 240 will cause the elevator to be driven upwardly when moved to one side of center and downwardly when moved to the other side of center.

When the plane is flying under the control of this system and it is noted that because of shifting load, different amounts of power in the engine of either wing, or for any other reason the plane is not in the desired attitude, the centering potentiometers 34 and 35; 134 and 135; 234 and 235 may be used to change the position of the ailerons, rudder, or elevator respectively. To understand the operation of this, let it be assumed that the bridge 30 of the aileron network 10 is balanced so that it develops no voltage between the wiper 33 of the rebalancing potentiometer 31 and the wiper 42 of the gyroscopically operated potentiometer 40, and that wipers 33 and 42 are in the mid-positions as are wipers 38 and 39 of the centering potentiometers 34 and 35. If the wipers 38 and 39 of the centering potentiometers 34 and 35 are now moved to the position shown in Figure 1, resistance will have been added to the left hand side of the bridge and moved from the right hand side of the bridge creating an unbalance and causing the amplifier 13 to drive the servo motor 16 so as to move the wiper 33 of the balancing potentiometer 31 toward the left, until a new balance point is reached. The ailerons, of course, have been moved by the operation of the servo motor 16 and the airplane hence moves about its roll axis until a new point of balance for the control system is established.

As is well known to those familiar with the operation of airplanes, at low air speeds it is necessary to secure a much greater movement of the control surfaces to produce a given maneuver that it is at high air speeds; and since to have a control system which will be satisfactory, it must operate the air plane properly at low, medium and high speeds, provision has been made for varying the amount of control surface displacement for a given deviation of the plane from its predetermined position. As shown in the aileron network 10, I have provided a three-position switch 50 which permits any one of the three fixed resistors 46, 47 or 48 to be connected in series with fixed resistor 49 and in parallel with the balancing potentiometer 31. Applying the laws of elementary electricity, the resistance across the parallel circuit thus formed will be the lowest when the low resistance fixed resistor is in the circuit and highest when the highest resistance fixed resistor is in the circuit; and since the combined resistance of the centering potentiometers 34 and 35 remain a constant, the total resistance across the series parallel circuit including the centering potentiometers 34 and 35, rebalancing potentiometer 31, and fixed resistors 46, 47, 48 and 49 will vary as switch 50 is thrown to its different positions. Since the voltage supplied by the secondary 44 of the transformer 43 remains substantially a constant, and since the voltage drop across the individual resistors in a series circuit varies as their resistance, it follows that when a low resistance fixed resistor is connected in series with the fixed resistor 49, the potential difference across the ends of the resistance 32 of the rebalancing potentiometer 31 will be lower; and when a high resistance fixed resistor is connected in series with the fixed resistor 49, the voltage drop across the resistor 32 will be higher.

It is apparent that the control system described herein operates on a system of balanced voltages, and if a given signal is put into the amplifier, the servomotor will be driven until a corresponding voltage of opposite phase is introduced by the rebalancing potentiometer 31. If the voltage drop across the potentiometer 31 is small, corresponding to a condition when the switch 50 is connected to a low resistance fixed resistor, the wiper 33 must be moved a greater distance to equal the given voltage signal than when the voltage drop across the potentiometer is high. Thus, when a large movement of the aileron control surfaces is desired, corresponding to a low airspeed, the switch 50 is connected to a fixed resistor having a low resistance value, and when small movement of the control surfaces is desired, corresponding to a higher airspeed, the switch 50 is connected to a resistor having a high resistance. A similar method of providing means for adjusting the degree of control surface movement is provided in the elevator bridge 230 and a comparable method based on the same general theory is provided in the rudder bridge 130.

If it is now assumed that the plane is flying under the control of this system, maintaining the proper heading, altitude and attitude and correcting for any deviation therefrom, the pilot may still desire to turn the ship to a new heading; and to do this he could use the centering potentiometers 34 and 35 in the aileron circuit to provide the proper amount of bank and then use the centering potentiometers 134 and 135 to secure the proper amount of rudder control to provide a coordinated turn. However, this is not a very satisfactory method of making turns and hence the turn control bridge 85 is provided. To make a turn the pilot merely moves the wiper 88 of the potentiometer 86 to one side or the other, depending upon the desired direction of turn, and a voltage will be developed between the wiper 88 and the grounded center tap connection of the resistance 87. This voltage is then applied to one side of the bridge 80 which has the other side grounded through a fixed resistor 84, and by adjusting the position of the wiper 83 of the trimmer potentiometer 81 the turn control bridge may be calibrated to provide the desired bank for a given amount of movement of the wiper 88. Similarly, the amount of rudder control necessary to provide a coordinated turn for this amount of bank may be secured by adjusting the wiper 183 of the trimmer potentiometer 181; and hence by turning a single turn control potentiometer 86, the proper signal in the proper amount may be introduced in both the aileron and rudder networks to provide a coordinated turn.

It will be seen that if no other means were provided, as soon as the turn was made with the turn control potentiometer 86 the ship would change its heading and the directional gyroscope would sense this and provide a correcting signal to bring the ship back to course. To take care of this condition, locking means, to be described later, lock the mechanical linkage 93 against movement whenever a turn is made by means of the turn control potentiometer 86, and hence all of the wipers operated by this linkage are held in center position and no signal is put in tending to return the ship to its original heading.

Considering now a portion of the procedure which must be followed before placing the system in operation by connecting the amplifiers 13, 14 and 15 to the servo motors 16, 17 and 18, it will be apparent that the wiper 88 of the turn control potentiometer 86 should first be centered so that no signal will be fed into the aileron and rudder networks 10 and 11 from the turn control bridge 85. The wipers 38 and 39; 138 and 139; and 238 and 239 of the centering potentiometers 34, 35; 134, 135; 234 and 235 respectively are also preferably in center position so that it will be possible to trim the ship by moving all of the control surfaces in either of their directions. The wiper 54 of the banking potentiometer 52, the wiper 57 of the banking acceleration potentiometer 55, and the wiper 142 of the rudder gyroscopically operated potentiometer 140 should also be centered so that the directional gyroscope 92 will have equal control in either direction in azimuth. The airplane itself should be trimmed so that it is flying in the proper attitude and on the proper heading; and since the control surfaces will then be adjusted so as to maintain the plane in its proper attitude and heading, it is important that under all these conditions that the signal from the networks 10, 11 and 12 to the amplifiers 13, 14 and 15 respectively be zero so that when the corresponding servo motors 16, 17 and 18 are connected to their respective amplifiers there will be no movement of any control surface which would tend to cause the plane to change its attitude or heading. Because of loading or other conditions, it may be necessary to use a certain amount of aileron control surface in order to hold the wings of the ship level; and in such a case a signal would be developed in the bridge 30 and transmitted on to the amplifier 13. This signal must be canceled by an opposing signal so that the aileron servo motor 16 will not be driven when it is connected to the amplifier 13; and to provide this opposing signal, switching means 91 is arranged so that when the amplifier is not connected to the aileron servo motor 16, it is connected to the aileron network balancing motor 77, this being a two-position switching means with no off position. The balancing motor 77 is a small reversible motor whose only function is to drive the wiper 74 across the resistor 73 of the potentiometer 72, and the characteristics of this motor are such that if there is a signal through the amplifier which would operate the servo motor 16, that same signal when going to the balancing motor will drive the latter so that the wiper 74 is moved in a direction to oppose and counteract the signal from the remainder of the network 10. As soon as the signal from the remainder of the network 10 is counteracted, the signal through the amplifier becomes zero and there is thus no signal to the balancing motor from the amplifier and movement of the wiper 74 is stopped. The switching means 91 may then be operated to connect the amplifier 13 to the servo motor 16 and there will be no movement of the servo motor which would drive the control surface and cause the ship to lurch. The operation of the balancing motors 177 and 277 with regard to the signal developed by the networks 11 and 12 respectively is the same, and it will thus be seen that it will be possible to operate the switching means 91, 191 and 291 to engage the control system on all the axes without there being any lurching of the plane or any violent movement of any of the control surfaces thereof.

*Power circuit*

In Figure 2 I have shown a power circuit for use with my control system, making use of several safety features not previously available. In the power system shown, a source of power such as the ship's batteries 301 or generators (not shown) or both is connected to the usual single wire power system used in planes, with one terminal of the battery grounded and the other terminal connected through the plane's master switch 302 to a bus bar 303. Connected to the ship's bus 303 is a system master switch 304 which energizes a system bus 339, and all power to the control system is controlled by this switch so that in case of emergency it is necessary only to open this switch and all operation of the control system immediately ceases. When the switch 304 is closed, power flows from it through the coil 305 of a current sensitive relay 306 and then through conductor 309 to the directional gyroscope 92 where it energizes the motor 307, shown in Figure 3, driving the rotor of the gyroscope. The characteristics of the motor 307 are such that when it is initially energized and during the major portion of the time it is accelerating, the amount of current it draws is considerably above the amount drawn when it has reached its final operating speed. The current sensitive relay 306 has a pair of contacts 308 which are normally in a closed position, but which are opened when the current through the coil 305 exceeds a predetermined value. The current sensitive relay 306 is adjusted so that upon starting the motor 307 and continuing until it has reached a speed sufficient to give the gyroscope an appreciable spatial rigidity, the contacts 308 remain open; but when the gyroscope has acquired the necessary rigidity the contacts are closed and a circuit is completed through them from the master switch 304 through conductor 310, to a torque motor 323 whose function and operation are hereinafter described.

To provide the alternating current necessary to operate the control networks previously described, an inverter 311 is provided which has its input circuit connected to the master switch 304 and to ground, and has its alternating current output circuit connected to the various transformers of the control network and may also be connected as shown to the amplifiers 13, 14 and 15 for use as a power source therein should that appear desirable. If direct current power is also desired in the amplifiers they may likewise be connected to the switch 304 and be energized therefrom.

The closing of switch 304 also energizes the vertical gyroscope 94 which has connected in series with its power lead an operating coil 312 of a current sensitive relay 313, the contacts 314 of which are normally opened but are adapted to be closed when the gyroscope is first energized and to remain closed until it has reached a speed sufficient to provide the necessary spatial rigidity.

When the switch 304 is closed it will thus be seen that the directional gyroscope 92 is energized and the motor therein starts to rotate and bring the gyroscope up to speed; and as it approaches its normal operating speed contacts 308 of relay 306 are closed and the torque motor 323 is energized. At the same time that the directional gyroscope 92 is energized, the inverter 311 is energized, and starts to deliver alternating current to the networks 10, 11 and 12 which are thereby placed in operative condition, the amplifiers 13, 14 and 15 are energized by the inverter and/or the power flowing directly from switch 304, and the vertical gyroscope 94 is likewise energized so that the rotor therein begins to revolve and is erected to a vertical position by means not shown. It will be apparent that during this warm-up period, while the gyroscopes are erecting and attaining their spatial rigidity, the servo motors 16, 17 and 18 should not be connected to their respective amplifiers 13, 14 and 15, since the transient conditions present during this period would cause erratic movement of the control surfaces with resulting undesired movement of the plane. During this period, therefore, the output of the amplifiers 13, 14 and 15 is directed by the switching means 91, 191 and 291 to the respective balancing motors 77, 177 and 277 so that the networks 10, 11 and 12 are continually balanced as these transient conditions may require. When these transient conditions have passed and it is desired to have this system control the flight of the plane, a switch 315 may be thrown to complete a circuit from the master switch 304 through switch 315, conductor 320, the contacts 316 of a relay 317, and conductor 321 to the operating coil 318 of a relay 319. The energization of the coil 318 of the relay 319 acts to operate the switching means 91, 191 and 291 so that the output of the amplifiers 13, 14 and 15 is transferred from the corresponding balancing motors 77, 177 and 277 to the corresponding servo motors 16, 17 and 18. Under these conditions the networks 10, 11 and 12 have been balanced so that no signal is sent from them to the amplifiers which would cause the servo motors to drive the control surfaces to new positions when the control system is engaged.

If, in spite of its balancing motor, for some reason or other one of the networks is unbalanced and it transmitting a signal to its amplifiers, a signal will be sent to the corresponding centering motor and that same signal would be sent to the servo motor should the relay 319 be operated to transfer the amplifier output to the servo motor. This would cause the plane to lurch and is generally undesirable.

To prevent the engaging of the system until each network is balanced, the relay 317 is provided with a number of coils each one of which is capable of attracting the armature of the relay and thus opening the circuit between the contacts 316. One of the coils of the relay 317 is connected through conductor 358, contacts 314 of the current sensitive relay 313, and conductor 359 to the master switch 304 so that should the vertical gyroscope be rotating at a speed below that needed to give it sufficient rigidity, the contacts 314 will be closed and the associated coil in the relay 317 will be energized and thereby open the contacts 316 to prevent the operations of the relay 319. I have connected the remaining coils of the relay 317 so that each one is in parallel with a corresponding winding of one of the balancing motors, so that should any one of the balancing motors be receiving a signal tending to drive it in either direction when an attempt is made to engage the control system, at least one of the windings of the relay 317 will be energized and the contacts 316 will be open and so prevent the operation of relay 319 to transfer the output of the amplifier to their respective servo motors. In case the plane is flying in rough air, minor changes in its altitude will be occurring continuously; and if no provision were made for this, these changes in attitude would cause the relay 317 to be energized almost continuously because of the slight changes of position required of the balancing motors. To take care of this contingency, I provide a time delay means on the relay 317 which may take the form of a time delay slug 322 which will prevent the operation of the relay until one or more of the coils has been continuously energized for an appreciable time. Multiple coil relays and time delay slugs are well known in the art, and any suitable units may be used.

It will thus be seen that I have provided a system in which the closing of one switch energized the control networks and starts the rotating units, but engagement of the system is prevented until the rotating units are up to speed and the control networks are balanced. In this connection it might be well to note that in airplane electrical systems the voltage available at the main bus 303 often varies over a wide range, and under these conditions it may be difficult if not impossible to adjust the current sensitive relay 313 in series with the vertical gyroscope 94 so that the contacts 314 will be opened immediately upon the gyroscope's being erected and coming up to speed and not before then. If voltage fluctuations cause these troubles, it is possible, of course, to substitute a time delay relay of any suitable type, adjustable to the proper time interval, for the current sensitive relay 313. A portion of the circuit shown in Figure 2 is shown with a time delay switch in place of the current-sensitive relay, in Figure 2a. In this figure I have shown a time delay switch 391 which may be of any suitable type, such as thermal, motor driven, etc., and which is energized when the vertical gyroscope 94 is energized, to complete a circuit through conductors 358 and 359 to a winding of multiple-coil relay 317. After a predetermined period of time, sufficient for the rotor of the gyroscope 94 to come up to speed, the circuit is opened, and the remainder of the operation is the same as that previously described. Timing relays generally work very well, but motor driven time delays are usually not so satisfactory since from their nature, if the system's master switch 304 is opened and then immediately closed, the pilot must wait the full period of the time delay before he can reengage the control system, although it will be apparent that the momentary interruption of current to the vertical gyroscope will not have caused it to lose sufficient speed to require erecting again, or to have lost its spatial rigidity.

Turning now to the directional gyroscope and the elements associated with it which are now of interest, some of these elements are a torque motor 323, a directional arm lock or DAL. 324, and a directional panel 325. As may be seen in Figure 4, the directional gyroscope 92 includes an enclosed rotor 326 having the motor 307 therein (not shown) pivotally mounted for rotation about a horizontal axis and supported by a cardan ring 327 which is rotatable about a vertical axis passing through its center. A cardan gear 328, concentric with the vertical axis of rotation of the cardan 327, is mechanically connected to the latter so that the two rotate as a unit; and slip rings 329 axially spaced from the gear 328 and concentric therewith provide means for supplying power to the motor 307 within the housing 326. Above the slip rings 329 and rigidly connected to the cardan gear 328 and concentric therewith is a clutch drum 330 which may be engaged by a ring 331 to which is attached a directional arm 332. The ring 331 is split and provided with expanding means (not shown) which permit the clutch drum 330 and the ring 331 to cooperate to form a clutch which may be engaged or disengaged to permit movement of the directional arm 332 as the cardan ring 327 turns about its vertical axis. Stops, not shown, are provided which limit the movement of the directional arm 332, and when the arm has reached one of the limiting stops, further movement of the cardan ring 327 causes the clutch drum 330 to slip within the ring 331.

As is well known to those familiar with gyroscopes, when an external force is applied to a gyroscope tending to turn it about an axis perpendicular to its axis of rotation, the gyroscope actually turns or precesses about an axis perpendicular to the axis of rotation of the gyroscope and perpendicular to the axis about which the force is acting. As is also known to those familiar with gyroscopes, a gyroscope tends to retain its heading in space unless caused by external forces to change this heading. While the rotor of the gyroscope 326 does exhibit these characteristics of spatial rigidity, the friction of the cardan gear 328, slip rings 329, directional arm 332, and associated equipment is sufficient to cause the cardan ring 327 and hence the gyroscope 326 to be rotated about a vertical axis when the ship is turned in space. However the rotation of the cardan ring about its vertical axis applies a torque or turning force to the gyroscope 326 and causes the latter to move about a horizontal axis perpendicular to its axis of rotation so that the gyroscope bobs or tilts.

This bobbing or tilting of the gyroscope may be used to control means for overcoming the effect of the frictional drag on the gyroscope and this may be done by providing a wiper 333 which may make contact with any one of a series of sectors 334, 335, 336 and 337 mounted on an insulating plate 338 which is attached to the cardan ring 327. The sectors 334 and 335 are so located that they will be contacted by the wiper 333 when that end of gyroscope has tilted below the horizontal and contacts 336, and 337 are so located that they will be contacted by the wiper 333 when that end of the gyroscope has tilted above the horizontal, thus leaving a space between sectors 335 and 336 on which the wiper 333 will ride when the gyroscope is horizontal.

To provide the restoring force necessary to keep the rotor 326 of the gyroscope horizontal, the torque motor 323 is provided, consisting of a continuously running motor 340 driving a pair of gears 341 and 342 so that they rotate in opposite direction. As shown in Figure 4, the lower surfaces of gears 341 and 342 are provided with clutch plates 343 and 344 respectively, and axially movable into engagement with these clutch plates are the associated clutch plates 345 and 346 respectively. Connected to the movable clutch plates 345 and 346 are pinion gears 347 and 348, respectively, both of which are continuously meshed with gear 349 which drives gear 350, the latter gear being meshed with the cardan gear 328. Normally, the clutch discs 345 and 346 do not engage their associated discs 343 and 344, but when, as shown in Figure 4, disc 346 engages its associated disc 344, the gear 342 attempts to rotate the gear 348 and this attempted rotation is transmitted through gears 349 and 350 to the cardan gear 328, thereby attempting to rotate the gyroscope rotor 326 about its vertical axis and hence causing it to tilt about its horizontal axis. To move the clutch discs 345 and 346 into engagement with their associated discs 343 and 344 respectively, a pair of electromagnets 351 and 352 which have armatures 353 and 354 are provided. The armatures 353 and 354 are adapted to bear against the ends of their respective gears 347 and 348 and urge the associated movable clutch discs 345 and 346, respectively, into engagement with clutch discs 343 and 344 when their associated electromagnets 351 and 352 are energized.

The electromagnets 351 and 352 are selectively energized by means of the wiper 333 and contacts 334, 335, 336 and 337; and as shown in Figure 4, electromagnet 352 is energized by reason of the fact that wiper 333 is making contact with sector 334 and hence gear 342 is attempting to drive the cardan gear 328 which will result in the rotor 326 of the gyroscope being returned to horizontal position. Sectors 334 and 337 are connected to separate slip rings 329 and sector 335 is connected through a resistor 356, shown in Figure 3, to the same slip ring that sector 334 is connected, while sector 336 is connected through a resistor 357 to the same slip ring that sector 337 is connected. The effect of resistors 356 and 357 is to provide a smaller impulse to the electromagnets 351 and 352 when the inner sectors 335 and 336 are connected by the wiper 333 than when the outer sectors 334 and 337 are similarly contacted. This means that a smaller amount of torque will be applied to the cardan gear 328 when the gyroscope rotor 326 has tipped a small amount than when it has tilted through a larger angle. Stops 360 and 361 are provided in the cardan ring 327 to prevent the gyroscope rotor 326 from tilting too far before the torque motor 323 can return the rotor to its horizontal position.

The directional gyroscope which I have just described in and of itself forms no part of my invention since such gyroscopes are well known in the art, and the description has merely been included in order to point out more clearly the features and the operation of the improvements I have developed therefor.

The operation of the directional arm lock 324 may now be more clearly understood, reference being had to Figures 2, 3 and 4 of the drawing. As has previously been mentioned, for proper operation of the control system it is necessary that the wipers 54 and 57 of the banking potentiometer 52 and the banking accelerating potentiometer 55 and the wiper 142 of the rudder gyroscopically operated potentiometer 140 must be centered with respect to the ends of the resistors of their respective potentiometers before the control system is engaged, and when turns are being made with the control potentiometer 86 while the system is engaged. Since the operation of the directional gyroscope 92 and its associated potentiometers is to keep the plane headed so that the wipers of these potentiometers remain in substantially their center position during normal flight, all that remains to be done is to insure that the wipers will remain in this position when a turn is made by the control potentiometer 86. As previously described, the wiper 88 of the control potentiometer 86 is manually operated, and mounted on the same shaft as the wiper 88 is a cam member 363 which operates a switch 364 so that the contacts of the latter are opened when the wiper 88 is in its mid position and closed when it is moved to either side thereof. The directional arm lock 324 consists of a solenoid 365 which, when energized, attracts a clamping bar 366 which then moves to bear against arm 367 which, like arm 332, forms a portion of the mechanical linkage 93 connecting the directional gyroscope 92 to its various potentiometer wipers. The arm 367, which is normally movable back and forth as indicated by the arrows in Figure 3, will then be clamped so that it can no longer move, and slippage will then occur between the clutch drum 330 and the ring 331. To energize the solenoid 365, a circuit is completed from system bus 339, through switch 364, conductor 362, solenoid 365, and through a wiper 371 and contact 374, described later, to ground. When the contacts of switch 364 are opened the solenoid 365 is de-energized and the arm 367 is released.

To provide means for centering the wipers of the various directional gyro controlled potentiometers before the control system is engaged, I have made use of the motor 340 of the torque motor 323, and the electromagnets 351 and 352 associated therewith. This centering is accomplished only when the system is not engaged and is controlled by a pair of wipers 370 and 371 connected to a gyroscopically operated arm which may be an extension of directional gyro arm 332, the wipers cooperating with a series of contacts 372, 373 and 374. The wiper 370 may bear against contact 372 and 373 or neither of them, this latter condition occurring when the wipers of the potentiometers operated by the directional gyroscope are centered; and wiper 371 bears against contact 374 when the wipers of the potentiometers are centered. The contacts 372, 373 and 374 together with the wipers 370 and 371 may be conveniently located within the panel which houses the potentiometers operated by the directional gyroscope, this housing being referred to as the directional panel 325. Contact 374 is grounded, and when wiper 371 makes contact therewith a circuit is completed to the coil 365 of the directional arm lock 324. A circuit may be traced (Figure 3) from ground to the contact 374, through the wiper 371, through the solenoid coil 365, and, when the control system is engaged, through switch 364 and switch 304 to the energized side of the plane's electrical system as indicated by the bus 303. When switch 315 is in the autopilot disengage position shown in Figure 2, i. e., so that it energizes conductor 362, it shorts switch 364 to energize coil 365 of directional arm lock 324 from whence the circuit is completed through the wiper 371 and contact 374 as previously mentioned.

In addition to energizing the solenoid 365 of the directional arm lock 324, the wiper 371 and contact 374 cooperate to energize the winding 380 of a relay 381, the other end of whose winding is connected, with the ungrounded side of the torque motor 340, through the contacts 308 of the current sensitive relay 306 to the master switch 304. This relay has two pairs of normally open contacts 382 which interrupt the circuit from the slip rings 329 to the electromagnets 351 and 352 of the torque motor 323, the result being that in order for the wiper 333 on the end of the gyroscope rotor 336 to have any effect upon the horizontal position of that rotor when contact is made with one of the sectors 334, 335, 336 or 337, the wiper 371 must bear against contact 374 and energize the relay 381 to complete the circuit to the electromagnets 351 and 352.

When wiper 371 is not touching contact 374, wiper 370, which moves with wiper 371, will then be touching either contact 372 or 373; and these latter contacts are connected to selectively energize the electromagnets 351 and 352 of the torque motor 323. The operation under these conditions can be best understood by referring to Figures 4 and 5 wherein it is seen that wiper 370 is bearing against contact 372 and wiper 371 is not touching contact 374. The contacts 382 of relay 381 are thus open and, as seen in Figure 4, electromagnet 352 is energized so that gear 342 attempts to drive the cardan gear 328. As previously explained, this will cause the rotor 326 of the gyroscope to tilt, but since sectors 334, 335, 336 and 337 are disconnected from their respective electromagnets 351 and 352, the tilting will cause no corresponding action of the electromagnets, and the rotor 326 will continue to tilt until it hits one of the stops 360 or 361. As is normal under such conditions, when a torque is applied to a gyroscope and the latter tilts until it hits a stop, further application of that torque will cause rotation of the gyroscope in the direction of the applied torque, which may then be of greatly reduced value. Consequently, when wiper 370 bears against contact 372, electromagnet 352 is energized, clutch plate 346 moves into engagement with clutch plate 344 and gear 342 drives the cardan gear 328 causing the gyroscope rotor 326 to turn and the whole assembly of gyroscope, cardan ring 327, cardan gear 328 and associated equipment to rotate, thereby moving wiper 370 towards center. When wiper 370 reaches its mid position, its connection with contact 372 is broken, releasing the electromagnet 352 and stopping the drive of the cardan gear 328; at the same time wiper 371 has made connection with contact 374, energizing the locking solenoid 365 and also energizing the relay 381 which thereupon restores the normal circuit of the wiper 333 and contacts 334, 335, 336 and 337 so that the gyroscope rotor 326 is then returned to its horizontal position. Since locking solenoid 365 is energized as soon as the wipers 370 and 371 return to their mid position, the directional arm 367 is immediately locked in position and there is thus no possibility of angular momentum carrying the cardan gear 328 past its desired position and hence driving wiper 370 beyond its mid point so that it bears against contact 373.

To prevent wiper 370 and contacts 372 and 373 from completing a circuit which would cause the torque motor 323 to revolve the rotor 326 and center the various potentiometers controlled by it when the plane is being controlled by the automatic pilot, I provide a relay 385 having an operating coil 386, a normally open contact 387, a normally closed contact 388, and a movable contact 389 adapted to bear against either of the other two contacts. Movable contact 389 is grounded, and normally closed contact 388 is connected to wiper 370, so that when coil 386 is not energized, wiper 370 is grounded and the operation is as previously described. Normally open contact 387 is connected to wiper 371, and thus when coil 386 is energized, wiper 371 is grounded through normally open contact 387 and movable contact 389 irrespective of whether wiper 371 is bearing against contact 374 or not. Thus, when operating coil 386 is energized, movable contact 389 opens the ground circuit to normally closed contact 388 and grounds normally open contact 387, thereby preventing wiper 370 from completing a circuit to electromagnets 351 or 352, and also continuously grounding wiper 371 so that relay 381 is continuously energized to close contacts 382 and maintain the normal circuits to the electromagnets 351 and 352 from slip rings 329. To energize operating coil 386, one end thereof is grounded and the other end is connected by conductor 390 to conductor 320, and hence relay 385 is operated when switch 315 is in the position wherein switching relay 319 may be energized. In this way, the potentiometer wipers controlled by the directional gyroscope 92 will automatically be centered when the switch 315 is in the position shown in Figure 2, but when the switch is thrown to its other position and the autopilot is engaged, the centering circuits are broken and any deviation of the plane from its assigned heading will cause a movement of the wipers controlled by the directional gyroscope 92, and they will be returned to their centered position only by return of the plane to its original heading.

*Operation of the power system*

It may now be appreciated that my invention has simplified the operation of a control system such as this, since the operations which a pilot must perform in order to engage this system have been enormously simplified and reduced over those necessary in previous systems.

To prepare the system, assuming that the plane is airborne and that the master switch 302 is closed, the pilot must first close control system master switch 304 and then trim the plane manually so that it has the desired attitude and heading. When the system is so prepared, power is immediately applied to the directional stabilizer 92, the inverter 311, the amplifiers 13, 14 and 15, the vertical gyroscope 94. The bridge networks 10, 11 and 12 are thus energized and the amplifiers 13, 14 and 15 are energized and warming up; the torque motor 323, because of the large initial current through the current sensitive relay 306, is not energized; and the similar large current drain by the vertical gyroscope 94 through the current sensitive relay 313 has closed the contacts 314 thereof and energized the corresponding coil of the relay 317 so that the contacts 316 thereof are open. The relay 319 is thus not energized, and the switching means 91, 191 and 291 are thus transmitting the power output of the amplifiers 13, 14 and 15 to the corresponding balancing motors 77, 177 and 277 so that as the amplifiers warm up, any signals developed in the networks 10, 11 or 12 will be used to drive the balancing motors so that these signals are balanced out. As the directional gyroscope 92 gathers speed, the current it draws will be reduced and eventually the contact 308 of the current sensitive relay 306 will be closed and the torque motor 323 energized. Were it not for this delay, and if the torque motor were energized at the same time that the directional gyroscope were energized, the gyroscope would have no spatial rigidity and the torque applied to it by the torque motor would rotate it very rapidly and thereby cause the rotor 326 to bang violently against its stop and probably damage the bearings of the rotor.

When the torque motor 323 is energized, the automatic centering means consisting of the wipers 370, 371 and their associated contacts cause the mechanical linkage 93 to be driven so that the wipers 54 and 57 of the banking potentiometer 52 and the banking accelerating potentiometer 55 respectively, and the wiper 142 of the rudder gyroscopically operated potentiometer 140 are placed in their center positions. In addition, the directional arm lock 324 is energized as soon as these positions are attained and hence there will be no further movement of these wipers until the system is engaged.

When the plane has been trimmed to the satisfaction of the pilot, the directional gyroscope 92 has attained a sufficient speed to allow the contacts 308 to close and energize the torque motor 323, the vertical gyroscope 94 has attained a sufficient speed to enable the contacts 314 of the relay 313 to open, and the balancing motors 77, 177 and 277 have balanced out all but momentary and transient signals from the aileron, rudder, and elevator networks 10, 11 and 12, the contacts 316 of the relay 317 will then be closed and the pilot may throw switch 315 to complete a circuit through contacts 316 and coil 318 of relay 319 and then to ground, thereby operating the switching means 91, 191 and 291 to transfer the power output of the amplifiers 13, 14 and 15 to the servo motors 16, 17 and 18. Thus, all that the pilot has to do is to throw the master switch 304, and then, after a period sufficient to enable the gyroscopes to assume their proper speed, throw switch 315 and the control system is then engaged and flying the plane. Changes in attitude and changes in heading may be taken care of as previously described, and it will thus be seen that I have provided a control system which operates to provide an extremely sensitive control of great flexibility while at the same time providing this system with an operating procedure so simple that a pilot who has had no experience in its use may become very proficient with only a few minutes instructions.

Because of the superiority of electrically operated automatic pilots, I have shown and described my invention as it may be applied to one of these. It is particularly adapted to such a system, though it may be seen that with slight modifications my invention may be applied to other control systems using fluid or mechanically operated elements, and the signals referred to in the claims may be electrical, fluid, or mechanical. While I have shown and described a preferred form of my invention, it is apparent that modifications thereof are possible, and I do not wish to be limited to the form shown except as indicated by the following claims:

I claim:

1. A directional gyroscope comprising, a supporting structure, a member rotatable about a normally vertical axis pivoted therein, a rotor housing pivoted in said member for movement about a normally horizontal axis, a rotor in said housing and having a spin axis perpendicular to the axis of said rotor housing, means for applying a torque in reverse directions to said rotatable member, control means actuated by movement of said rotor housing away from that position in which the spin axis of the rotor is perpendicular to said vertical axis to control said torque applying means to cause return of said rotor housing to the position in which the spin axis of said rotor is perpendicular to said vertical axis and means to prevent the application of torque to said member by said torque applying means for a period of time after application of spinning power to said rotor whereby to give said rotor time to come up to speed.

2. A directional gyroscope comprising, a supporting structure, a member rotatable about a normally vertical axis pivoted therein, a rotor housing pivoted in said member for movement about a normally horizontal axis, a rotor in said housing and having a spin axis perpendicular to the axis of said rotor housing, means for applying a torque in reverse directions to said rotatable member, control means actuated by movement of said rotor housing away from that position in which the spin axis of the rotor is perpendicular to said vertical axis to control said torque applying means to cause return of said rotor housing to the position in which the spin axis of said rotor is perpendicular to said vertical axis and means to prevent the application of torque to said member by said torque applying means until said rotor is spinning at a predetermined speed.

3. A directional gyroscope apparatus comprising, a supporting structure, a member rotatable about a normally vertical axis pivoted therein, a rotor housing pivoted in said member for movement about a normally horizontal axis, stop means for limiting the amount of movement of said rotor housing about its axis in each direction, a rotor in said housing and having a spin axis perpendicular to the axis of said rotor housing, means for applying a torque in reverse directions to said member, relatively movable control means carried by said supporting structure and said rotatable member and having a desired relative position when the apparatus is placed in operation, torque applying control means operated to control said torque applying means to apply torque to said rotatable member when said control means is not in the desired relative position, and additional means actuated upon return of said control means to the desired position to render said torque applying control means inoperative and to thereafter maintain the same inoperative.

4. A directional gyroscope apparatus comprising, a supporting structure, a member rotatable about a normally vertical axis pivoted therein, a rotor housing pivoted in said member for movement about a normally horizontal axis, stop means for limiting the amount of movement of said rotor housing about its axis in each direction, a rotor in said housing and having a spin axis perpendicular to the axis of said rotor housing, means for applying a torque in reverse directions to said member, relatively movable control means carried by said supporting structure and said rotatable member and having a desired relative position when the apparatus is placed in operation, torque applying control means operated to control said torque applying means to apply torque to said rotatable member when said control means is not in the desired relative position, additional means actuated upon return of said control means to the desired position to render said torque applying control means inoperative and to thereafter maintain the same inoperative, and means to prevent the application of torque to said member by said torque applying means for a period of time after application of spinning power to said rotor whereby to give said rotor time to come up to speed.

5. A centering device for a directional gyroscope having a directional arm connected thereto to operate a condition responsive element, a locking means adapted to engage said directional arm and prevent its movement, and a torque motor adapted to maintain said gyroscope in substantially horizontal position, said centering device including: a relay adapted to interrupt or restore the normal circuit and operation of said torque motor; switching means to cause said torque motor to turn the rotor of said gyroscope about a susbtantially vertical axis and thereby center said condition responsive element; and means to operate said locking means and simultaneously to operate said relay to restore the normal circuit and operation of said torque motor.

6. A centering device for a directional gyroscope having a directional arm connected thereto to operate a condition responsive element, a locking means adapted to engage said directional arm and prevent its movement, and a torque motor adapted to maintain said gyroscope in substantially horizontal position, said centering device including: a relay adapted to interrupt or restore the normal circuit and operation of said torque motor; a wiper operated by said directional arm; a pair of contacts adapted to be selectively engaged by said wiper when said condition responsive element is not at the center of its control range, said wiper and said pair of contacts being connected so as to cause said torque motor to turn the rotor of said gyroscope about a substantially vertical axis and thereby center said condition responsive element; a second wiper operated by said directional arm; and a contact adapted to be engaged by said second wiper when said condition responsive element is at the center of its control range, said second wiper and said contact being connected so as to operate said locking means and simultaneously to operate said relay to restore the normal circuit and operation of said torque motor.

7. A directional gyroscope which includes: a rotor having a substantially horizontal spin axis; a cardan ring supporting said rotor and adapted to rotate about a substantially vertical axis; control means movable about a substantially vertical axis and connectable to said cardan ring for operation thereby; a torque motor normally adapted to maintain the axis of said rotor substantially horizontal; and means to interrupt the normal operation of said torque motor and to cause it to rotate said rotor and said cardan about a substantially vertical axis to center said control means with respect to the response range of the latter.

8. A directional gyroscope which includes: a rotor having a substantially horizontal spin axis and pivotally mounted for movement about a substantially horizontal axis substantially perpendicular to said spin axis; torque motor means normally adapted to maintain said spin axis substantially horizontal; and means to prevent the energization of said torque motor means until said rotor has acquired a predetermined speed.

9. Apparatus for an aircraft having a control surface comprising: operating means adapted to position said control surface, control means for said operating means, a gyroscope having a rotor mounted for rotation about a first axis and angularly movable about two respectively perpendicular axes which are also perpendicular to said first axis, means for maintaining an angular relation between said first axis and one of said second axes by applying a torque about said third axis, means responsive to relative movements of the gyro and said aircraft about said third axis and connected to said control means, and means operative when the speed of the rotor is below a certain value for rendering ineffective the means for maintaining said angular relation.

10. Control apparatus for an aircraft having a control surface comprising: operating means adapted to position said control surface, control means for said operating means, a gyro having an electrically driven rotor whose impedance varies with the speed thereof and mounted for movement about three respectively perpendicular axes, means for maintaining an angular relationship between said rotor and one of said axes, means responsive to relative movement of the aircraft and the rotor about another axis and connected to said control means, and means operative when the impedance of the rotor is below a certain value for rendering ineffective the means for maintaining said angular relation.

11. Control apparatus for a craft comprising: a gyroscope, a control means having two relatively movable parts one of which may be positioned by said gyroscope and the other by said craft, means operated by said control means, means for disconnecting said control means and said operated means, motor operated means for placing the movable parts in a predetermined position in response to movements of said craft with respect to said gyroscope, and means for locking said gyro positioned part in said predetermined position.

12. Control apparatus for a craft comprising: a gyroscope, means including contacts and a motor for maintaining a predetermined relationship between the gyro rotor axis and an axis perpendicular thereto, a control means having a controller comprising two relatively movable parts one being positioned by the craft the other by said gyroscope, means operably connected to said control means, means for disconnecting said control means and said operably connected means, and further means adjusted with one of said controller parts for disassociating said contacts from said motor and for controlling said maintaining means so that said relatively movable parts are maintained in a predetermined relationship.

13. Control apparatus for a craft comprising: a gyroscope, reversible motor means for maintaining a predetermined relationship between the gyro rotor axis and an axis perpendicular thereto, a first control means operative upon the absence of the perpendicular relation for controlling said motor means, a second control means for said motor means responsive to changes in heading of the craft and direction of the rotor axis and having two relatively movable parts one being positioned by the craft the other by said gyroscope, operable means connected in series with said first control means and said motor means for connecting or disconnecting said first control means with said motor means, and means including a control element also movable by said gyro upon changes in heading for controlling said operable means for disassociating the first control means from its motor means when said gyro axis has moved with respect to the direction of heading of the craft, whereby said gyro and said craft are maintained in a predetermined relation.

14. In a condition control apparatus having a condition control means comprising a three degree of freedom gyroscope sensing changes in said condition, said gyroscope having a rotor spinning means therefor, means applying a torque to said gyroscope to precess the gyroscope rotor to a predetermined position, means for placing said control means into a desired null condition, and means effective on attainment of said desired condition by said control means to thereafter energize said torque means on departure of the gyroscope rotor from the predetermined position.

15. In a condition control apparatus a controller movable relative to a support therefor, a gyroscope connected to the controller and having a rotor spin axis and a second axis perpendicular thereto, means applying a torque to said gyroscope to cause the rotor to precess about the second axis, means including said torque means for placing said controller into a desired position relative to its support, and means for rendering said torque means ineffective to precess the rotor until the controller attains such desired position.

16. In a control means for operating a signal means upon positional disagreement of said control means and a support therefor, a gyroscope having a spin axis and a precession axis, torque means for said gyroscope to effect movement thereof about the precession axis, means responsive to positional disagreement of said control means and support for aligning said control means with its support, and means for rendering said torque means ineffective until said control means and support are aligned.

17. In a control means for a craft wherein said control means develops a control signal upon lack of positional agreement of said control means and craft, a gyroscope having torque applying means for supplying a couple about a vertical axis of said gyroscope for leveling the rotor thereof, rotor tilt detecting means for controlling said torque means, means for controlling said torque motor in response to positional disagreement of said control means, and means for transferring control of said torque means to said tilt detecting means upon said control means attaining positional agreement.

18. A gyroscopic control unit, for an automatic pilot for a craft, wherein a rotor has its spin axis mounted in a support, an axis for mounting said support perpendicular to said spin axis, a signal device responsive to positional disagreement of the support axis and the craft, torque means for effecting rotation of the rotor about the support axis, means for initially controlling said torque means from said signal means, and means for thereafter controlling said craft from said signal means.

19. An aligning arrangement for a gyroscopic positional control means having a three degree of freedom gyroscope providing control signals upon angular displacement, comprising spinning means for the rotor of said gyroscope, means for applying a torque to said gyroscope for precessing the rotor axis into a predetermined direction, means responsive to misalignment of said control means due to angular displacement of the gyroscope for primarily operating said torque means for placing said control means into alignment by reversing said displacement, and means responsive on attainment of the alignment and on departure of said rotor from its predetermined position to control said torque applying means.

20. The apparatus of claim 19, and means to limit the precession of said rotor while said alignment is being effected by reversing the displacement of the gyroscope.

21. In a gyroscopic positional control system wherein a gyroscope has a rotor with a normally horizontal spin axis and a second axis perpendicular thereto, means for applying couples about the second axis for leveling the gyro spin axis, means responsive to displacement from a null position about the second axis for controlling a condition, and means for initially controlling said torque means from said signal means to place said control system into the null position.

22. Presetting means for a gyroscopic responsive positional control system for an aircraft having signal means responsive to positional misalignment of said craft and gyroscopic means, comprising a rotor having a spin axis and a precession axis perpendicular thereto, torque applying means for effecting motion about the precession axis, a circuit for energizing the rotor spinning means, means responsive to the speed of said rotor and to tilt of said rotor about its precession axis for energizing said torque means.

23. The apparatus of claim 22, and further means for preventing control of said torque means by said tilt responsive means until said gyroscopic means is placed in alignment with said craft.

24. A gyroscopic positional control unit for an aircraft comprising a gyroscope having a rotor, torque means for precessing said rotor, means responsive to tilt of the rotor axis for controlling said torque means, means for energizing spinning means for said rotor, and means responsive to the rotation of said rotor by its spinning means for rendering said torque means effective by said tilt responsive means.

25. The apparatus of claim 24 in which said unit provides a control signal upon movement of the gyro axis perpendicular to the direction of tilt, and means responsive to said signal for initially controlling said torque means.

References Cited in the file of this patent

UNITED STATES PATENTS

| | | |
|---|---|---|
| 2,161,241 | Bates | June 6, 1939 |
| 2,410,473 | Weems | Nov. 5, 1946 |